(12) United States Patent
Fischgold et al.

(10) Patent No.: US 6,199,667 B1
(45) Date of Patent: Mar. 13, 2001

(54) METHOD AND APPARATUS FOR OPERATING AN ELEVATOR DRIVE IN DIFFERENT PERFORMANCE MODES

(75) Inventors: Carmen R. Fischgold, Mamaroneck; Jorge Cruz, Whitestone, both of NY (US)

(73) Assignee: Inventio AG, Hergiswil NW. (CH)

( * ) Notice: Subject to any disclaimer, the term of this patent is extended or adjusted under 35 U.S.C. 154(b) by 0 days.

(21) Appl. No.: 09/217,478

(22) Filed: Dec. 21, 1998

Related U.S. Application Data

(63) Continuation-in-part of application No. 08/774,740, filed on Dec. 31, 1996.

(51) Int. Cl.⁷ ..................................................... B66B 1/28
(52) U.S. Cl. ............................................. 187/295; 187/290
(58) Field of Search .................................... 187/289, 290, 187/293, 295, 296, 297; 318/61, 62, 105, 139

(56) References Cited

U.S. PATENT DOCUMENTS

| | | |
|---|---|---|
| 3,891,064 | 6/1975 | Clark . |
| 4,349,087 * | 9/1982 | Bittar et al. ........................ 187/29 R |
| 4,548,299 * | 10/1985 | Nomura .............................. 187/29 R |
| 4,640,389 * | 2/1987 | Kamike ................................. 187/119 |
| 5,042,621 | 8/1991 | Ovaska et al. . |
| 5,070,290 * | 12/1991 | Iwasa et al. .......................... 187/109 |
| 5,159,163 * | 10/1992 | Bahjat et al. ........................ 187/133 |
| 5,241,141 | 8/1993 | Cominelli . |
| 5,241,142 | 8/1993 | Thangavelu . |
| 5,266,757 | 11/1993 | Krapek et al. . |
| 5,290,976 | 3/1994 | Bahjat et al. . |
| 5,298,695 | 3/1994 | Bahjat et al. . |
| 5,307,903 | 5/1994 | Morita et al. . |
| 5,896,948 * | 4/1999 | Suur-Askola et al. ............... 187/290 |

* cited by examiner

*Primary Examiner*—Jonathan Salata
(74) *Attorney, Agent, or Firm*—MacMillan, Sobanski & Todd, LLC

(57) ABSTRACT

An elevator system for controlling movement of an elevator car coupled to a drive to serve floors in a building in response to hall calls generated from a plurality of hall call devices located at floors served by the elevator car, includes a control for generating a velocity pattern signal from stored parameter values representing desired jerk, acceleration and constant speed relative to time. The drive responds to the velocity pattern signal to move the elevator car to the floor associated with each hall call. The control selectively generates a high performance velocity pattern signal and an energy conservation velocity pattern signal in response to parameter values that can be changed by user input. Sensing a predetermined condition such as the application emergency power to the drive and/or a high wind speed automatically modifies the velocity pattern signal.

12 Claims, 4 Drawing Sheets

Fig. 3A

CAR PARAMETERS

| PARAMETER | VALUE | PARAMETER | VALUE |
|---|---|---|---|
| MAX. ACCL. FACTOR: | 0 | FINAL DECL. RATE: | 0 |
| RATE OF ACCL. FACTOR | 0 | FINAL DECL. DISTANCE: | 0 |
| INT. RATE OF ACCL. FACTOR | 0 | | |
| INT. RATE OF ACCL. TIME: | 00:00 | | |

PERFORMANCE MODE:  0 - HIGH PERFORM
1 - ENERGY CONSERV  2 - DYNAMIC

Fig. 3B

ENERGY CONSERV STATUS BASED ON TIME AND DAY: 0 - HIGH PERFORM 1 - ENERGY CONSERV

| TIME: | ON | OFF | STATUS | M | T | W | T | F | S | S |
|---|---|---|---|---|---|---|---|---|---|---|
| | 00:00 | 00:00 | 0 | N | N | N | N | N | N | N |
| | 00:00 | 00:00 | 0 | N | N | N | N | N | N | N |
| | 00:00 | 00:00 | 0 | N | N | N | N | N | N | N |
| | 00:00 | 00:00 | 0 | N | N | N | N | N | N | N |

HALL CALL LONG WAIT TIME BEFORE SWITCHING TO HIGH PERFORM. 120

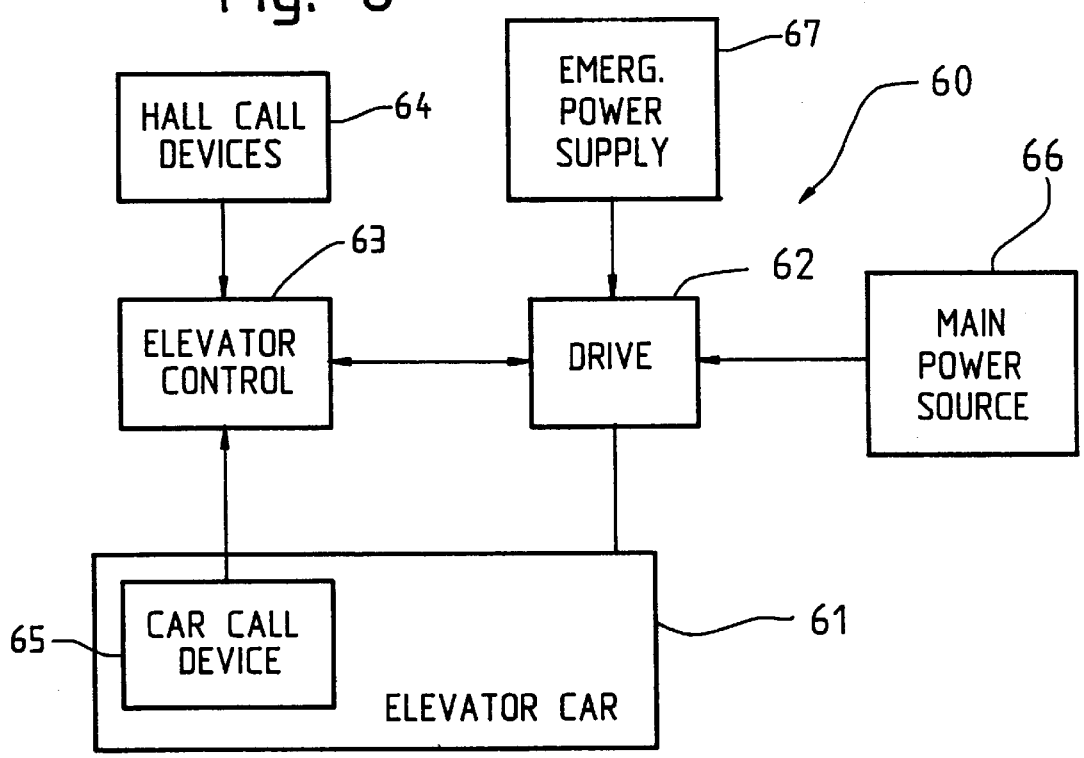
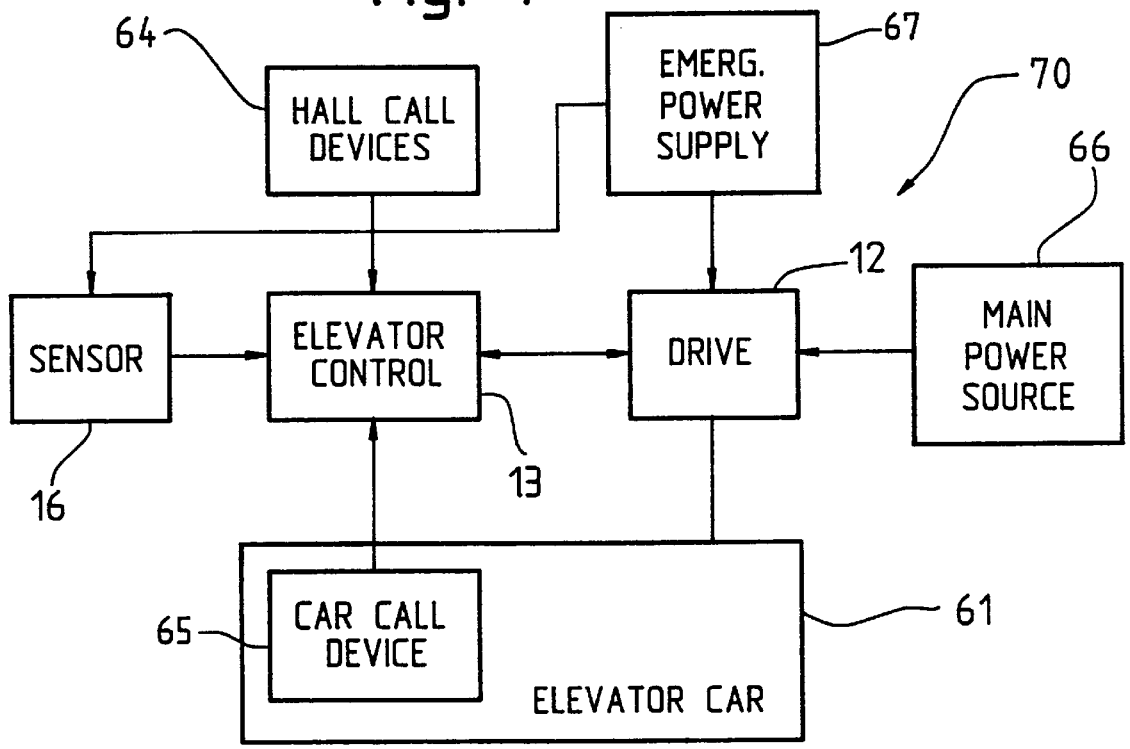

METHOD AND APPARATUS FOR OPERATING AN ELEVATOR DRIVE IN DIFFERENT PERFORMANCE MODES

CROSS-REFERENCE TO RELATED APPLICATION

This application is a continuation-in-part of the co-pending U.S. patent application Ser. No. 08/774,740, filed Dec. 31, 1996.

BACKGROUND OF THE INVENTION

The present invention relates generally to elevator control systems and, in particular, to an apparatus and method for controlling an elevator in an energy conservation mode of operation.

In the past, elevators were adjusted to their maximum performance parameters, thus providing the most service during heavy usage periods. Unfortunately, the elevators ran with this level of performance all the time, regardless of the building needs.

In the U.S. Pat. No. 3,891,064, there is shown an elevator system that automatically switches between rated maximum performance and a reduced performance according to traffic conditions. The system normally operates at the rated maximum velocity and acceleration mode. When the demand for elevator service falls below a predetermined level, the velocity and/or the acceleration is reduced. The system includes a plurality of "traffic sensors" each of which causes switching from the reduced performance mode to the rated maximum performance mode when a predetermined traffic condition is sensed. The "traffic sensors" can include a clock that controls the switching according to traffic history.

SUMMARY OF THE INVENTION

The present invention concerns an apparatus and method for controlling an elevator system having an elevator car mounted for movement in an elevator shaft of a building, a drive coupled to the elevator car for moving the elevator car to serve floors in the building and a plurality of hall call devices located at floors served by the elevator car for generating hall call signals in response to actuation by persons at the floors to be served by the elevator car. The apparatus includes a control means for generating a velocity pattern signal the control means storing parameter values representing desired jerk, acceleration and constant speed relative to time for the velocity pattern signal and generating the velocity pattern signal in response to each hall call signal generated by the hall call devices. The drive means responds to the velocity pattern signal to move the elevator car to the floor associated with each hall call signal. The control means generates a high performance velocity pattern signal from a first set of the parameter values in response to a first predetermined number of the hall call signals in a predetermined time period and generates an energy conservation velocity pattern signal from a second set of the parameter values in response to a second predetermined number of the hall call signals in the predetermined time period. The apparatus also includes an input device connected to the control means for generating input signals representing values of the parameters whereby a user can change at least one of the stored parameter values in each of the first and second sets of the parameter values thereby altering the high performance velocity pattern signal and the energy conservation velocity pattern signal.

The control means responds to a high performance set signal generated by the input means to continuously generate the high performance velocity pattern signal and responds to an energy conservation performance set signal generated by the input means to continuously generate the energy conservation performance velocity pattern signal. Further, the control means responds to time and day set signals generated by the input means to generate the energy conservation performance velocity pattern signal during selected times on selected days of the week. The control means delays switching from generating the high performance velocity pattern signal to generating the energy conservation performance velocity pattern signal until the high performance velocity pattern signal has been generated for a minimum predetermined time period.

The method of controlling an elevator system includes the steps of: a.) selectively operating an elevator control system in a high performance mode to move an elevator car to serve hall calls at floors in a building; b.) selectively operating the elevator control system in an energy conservation performance mode to move the elevator car to serve the hall calls; c.) selectively operating the elevator control system in a time and day performance mode including operating according to the step b. during selected time periods on selected days of the week and operating according to the step a. during all other times; and d.) when operation according to all of the steps a., b. and c. is not selected, operating the elevator control system in a dynamic mode including operating according to the step a in response to a generation of at least a predetermined number of the hall calls over a predetermined time period and operating the elevator control system according to the step b. in response to a generation of less than the predetermined number of hall calls over the predetermined time period. The high performance mode includes moving the elevator car at rated values of jerk, acceleration and constant speed and the energy conservation performance mode includes moving the elevator car at less than rated values of jerk and acceleration.

The step b. includes operating the elevator control system in an energy conservation performance mode to move the elevator car to serve the hall calls when there is a power failure and emergency power is required to move the elevator car. The step d. includes delaying switching from the high performance mode to the energy conservation mode until the elevator control system has been operated in the high performance mode for a minimum predetermined time period such as approximately three minutes. The step d. also includes switching from the energy conservation mode to the high performance mode when a hall call has been waiting to be served for a maximum predetermined time period such as approximately two minutes.

One or more sensors can be connected to an input of the control means to generate signals representing conditions that may require a change in the velocity pattern. For example, a wind speed sensor can be utilized to cause the control means to reduce the maximum constant speed to a lower constant speed. An emergency power sensor can be utilized to cause the control means to reduce the startup portion of the velocity pattern to reduce the acceleration phase of the pattern.

It is an object of the present invention to provide significant energy savings and reduction on the wear and tear on the elevator equipment without compromising the service in the building.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIGS. 3A and 3B are elevation views of the display screen of the control apparatus shown in the FIG. 1;

FIG. 6 is a block diagram of a prior art elevator system control apparatus; and

FIG. 7 is a block diagram of the elevator system control apparatus shown in the FIG. 6 modernized with the addition of the control apparatus according to the present invention.

DESCRIPTION OF THE PREFERRED EMBODIMENT

Figure 1:
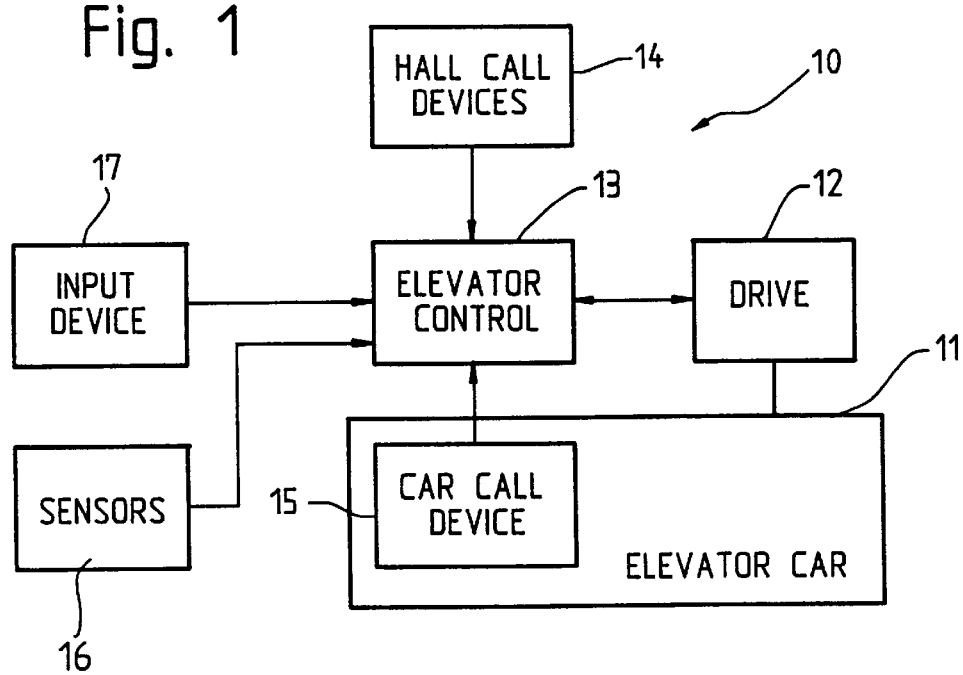
FIG. 1 is a block diagram of an elevator system including a control apparatus in accordance with the present invention.

There is shown in the FIG. 1 an elevator system 10 including an elevator car 11 mounted for movement in an elevator shaft (not shown) to serve various floors of a building. A drive means 12 is coupled to the car 11 in a conventional manner, such as a sheave and cable (not shown), for moving the car up and down the shaft. An elevator control means 13 is connected to the drive means 12 to control the speed thereof thereby controlling the starting, stopping and speed of movement of the car 11. The control means 13 has in input connected to a plurality of hall call devices 14 that are located at the floors to be served by the car 11. The hall call devices 14 are actuated by persons who desire to travel between the floors via the elevator car 11. Upon actuation, each hall call device 14 generates a hall call signal to the elevator control means 13 representing the floor at which the person is waiting. The control means 13 responds to the hall call signal by controlling the drive means 12 to start the car 11 moving in the direction of the floor associated with the hall call, moving the car in accordance with a predetermined velocity pattern and stopping the car at the floor.

A car call device 15 is located in the car 11 and is connected to another input to the control means 13 for actuation by a passenger to generate a car call signal representing a destination floor to which the passenger desires to travel. The control means 13 responds to the car call signal by controlling the drive means 12 to start the car 11 moving in the direction of the destination floor associated with the car call, moving the car with the predetermined velocity pattern and stopping the car at the destination floor.

A velocity pattern signal representing the desired speed of the car 11 versus time is generated to the drive means 12 by the control means 13. As discussed in more detail below, one or more sensors 16 are connected to another input to the control means 13 to provide information utilized to control the movement of the car 11. For example, the sensors 16 can include a car speed sensor that generates an actual speed signal, representing the actual speed of the car 11. The car speed sensor 16 can be any of a number of known speed sensing devices. The actual speed signal is compared to the velocity pattern signal to adjust the actual speed of the car 11 to conform to the velocity pattern signal when necessary. If the comparison is performed in the control means 13, an error or adjusting signal is generated to the drive means 12. If the drive means 12 performs the comparison, the control means 13 generates the velocity pattern signal and passes through the actual speed signal. An input device 17 is connected to yet another input to the control means 13 for inputting velocity pattern information representing the desired speed of the car 11 during startup, constant speed travel and slowdown to stopping.

Figure 2A:
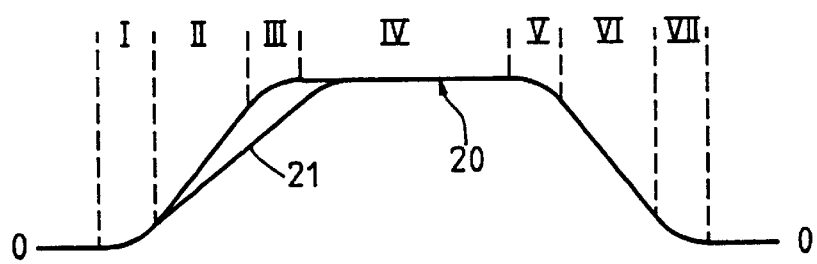
FIGS. 2A, 2B and 2C are velocity patterns generated by the control apparatus shown in the FIG. 1.

A typical velocity pattern 20 is shown in the FIG. 2A. The velocity pattern 20 begins at zero speed when the car 11 is at rest and accelerates to a predetermined maximum constant acceleration rate with a predetermined maximum rate of change of acceleration (jerk) during a phase I. A phase II is a constant acceleration phase and, when the maximum speed is approached, a phase m is entered which provides a smooth transition between the constant acceleration phase and a constant speed phase IV. The phase III also is controlled in accordance with a maximum level of jerk. When the car 11 is to stop at a floor, for example in response to a hall call, the velocity pattern enters a phase V which provides a jerk controlled transition between the constant speed phase IV and a constant deceleration phase VI. As the elevator car 11 nears the destination floor, the velocity pattern 20 enters a jerk controlled transition phase VII which brings the car from constant deceleration to zero speed at the floor level. Typically, the control means 13 generates the velocity pattern 20 as the velocity pattern signal with rated jerk, acceleration and speed.

It is known that the velocity pattern 20 can be modified to reduce performance in response to lowered traffic demands. For example, the elevator system shown in the U.S. Pat. No. 3,891,064 can be operated to modify the acceleration phase II to a lower maximum value during light traffic demand to provide a first pattern modification 21 as shown in the FIG. 2A. The first pattern modification 21 results in the elevator car reaching rated speed later than under the unmodified velocity pattern 20. The rate of change of acceleration in the phases I and IV also can be reduced.

Figure 2B:
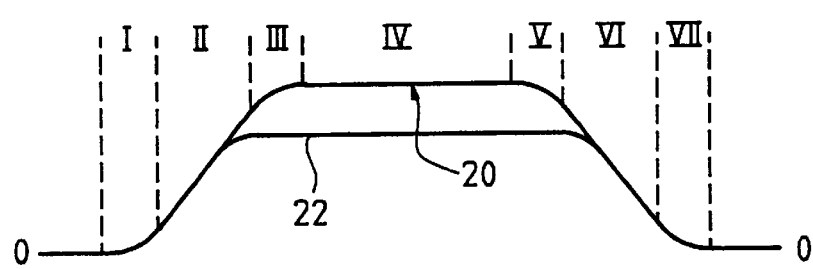
Figure 2C:
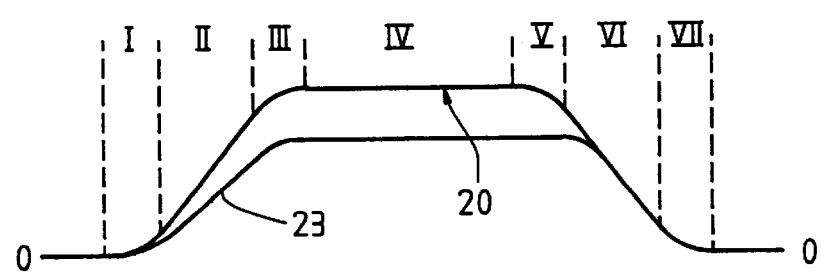

In the FIG. 2B, the constant velocity phase IV of the velocity pattern 20 has been reduced to a lower magnitude, as a second pattern modification 22, during periods of light traffic. In the FIG. 2C, the maximum acceleration rate and the maximum velocity, phases II and IV respectively of the velocity pattern 20, are reduced as a third pattern modification 23 during periods of light traffic. The maximum jerk in the phases I and IV also can be reduced. Clearly, any or all of rated jerk, acceleration and speed can be reduced to provide a second, modified velocity pattern.

The elevator control 10 according to the present invention provides significant energy savings and a reduction of the wear and tear on the elevator equipment without compromising the service in the building. Typically, during off hours and in low traffic periods, a slight decrease in performance is acceptable. An advantage of this approach is that the significant reduction in energy consumption is disproportionate to the slight reduction in the level of performance. An added benefit is a reduction of wear and tear on the elevator equipment such as reduced brush wear, better commutator filming, and reduced heating.

An example of the benefits achieved by the method of operating an elevator control in accordance with the present invention is a test performed on an 800 fpm, 3500 lbs. capacity elevator. The test was conducted with an empty car, balanced properly, running from the top floor to one floor below (a traveling distance of 11.5 ft.). The current to the motor was monitored while altering the most significant factors of the velocity pattern: the maximum acceleration factor and the rate of acceleration factor. With the elevator adjusted to have a brake to brake one floor run time of 4.75 seconds, a maximum acceleration factor of "5" and a rate of acceleration factor of "3", a very comfortable ride was generated. The current to the motor rose as the car was accelerated to a peak positive current of 220 Amps and decreased as the car decelerated. The test was repeated with a maximum acceleration factor of "2" and a rate of acceleration factor of "1". The brake to brake time increased to 5.25 seconds while the peak current was reduced to 165 Amps. This is a performance decrease of 10.5% (increased travel time) and a peak current decrease of 25%.

The method according to the present invention can be implemented in a dispatcher type control, or in a simplex car control, by utilizing an intelligent algorithm. Based upon the current level of traffic, the algorithm makes the decision to modify the elevator performance. Any performance decision can be overridden by the time of day (for example, four distinct time periods, per day of the week) and by optional switch inputs on the dispatcher (these inputs have the highest priority). In all cases, when switching from a high performance mode (regular operation with rated jerk, acceleration and constant speed) to the energy conservation mode, there is a predetermined time delay (such as three minutes) to provide de-bouncing in situations where the traffic level is rapidly fluctuating. There is no delay when switching from the energy conservation mode to the high performance mode, to provide immediate response to a build up in traffic.

The two performance levels, high performance (HIGH PERFORM) mode and energy conservation (ENERGY CONSERV) mode, are implemented by switching between two distinct speed curves. These curves are generated based on two sets of user enterable parameters located on a first car parameter screen. The parameters are: maximum acceleration factor, rate of acceleration factor, initial rate of acceleration factor, initial rate of acceleration time, final deceleration rate, and the final deceleration distance. There is shown in the FIG. 3A a first screen 30 of a display device that can be included in the input device 17 shown in the FIG. 1. If the display device is a touch screen, data can be entered by touching the corresponding area on the screen 30. Otherwise, any known input device such as a mouse or a keyboard can be used.

The elevator control 13 (FIG. 1) will adjust its performance parameters, only if the performance mode parameter is set for dynamic (2) which parameter is user enterable in an area 31 of the screen 30. If the performance mode parameter is set for the high performance mode (1) or the energy conversation mode (0), the elevator car 11 will run continuously in the selected performance mode. This is useful when tuning up the system 10. If the performance mode parameter is set to dynamic (2), the car performance mode will be determined based upon switch settings listed below in order of priority from highest to lowest:

1. The HP (high performance) input located on the control means 13 (on the dispatcher or on the car for a simplex control) will place the control means in the high performance mode.
2. The EC (energy conservation) input located on the control means 13 (on the dispatcher or on the car for a simplex control) will place the control means in the energy conservation mode.
3. Another parameter screen 32 is shown in the FIG. 3B which screen includes entries for: time on, time off, status, day of the week and long wait time. The parameter values shown are the default entries. As can be seen, the first four sets of parameters are used to set the energy conservation status by time and day of week.
4. If none of the first three switch settings are enabled, the performance level is set dynamically based upon a decision made by the dispatcher and the value of the "HALL CALL LONG WAIT TIME BEFORE SWITCHING TO HIGH PERFORM" time. In other words, if any hall call takes more than the user entered time to be answered (for example, 120 seconds), the control means 13 will make the cars switch to the high performance mode. In order to avoid any oscillatory condition where the system would switch back and forth between the HP mode and the EC mode, and to ensure proper service in the building once the cars switch to the HP mode, the control means 13 will stay in that mode for at least three minutes. Note that on a simplex car, the dispatcher's "HALL CALL LONG WAIT TIME BEFORE SWITCHING TO HIGH PERFORM" in a screen area 33 is replaced by an "AMOUNT OF CAR CALLS AND HALL CALLS BEFORE SWITCHING TO HIGH PERFORMANCE" in the same screen area.

The car 11 can have an optional indicator output, ECL, which turns on if the car is in the energy conservation mode. The performance mode is also displayed on the car screens as HP or EC (right bottom corner).

Figure 4:
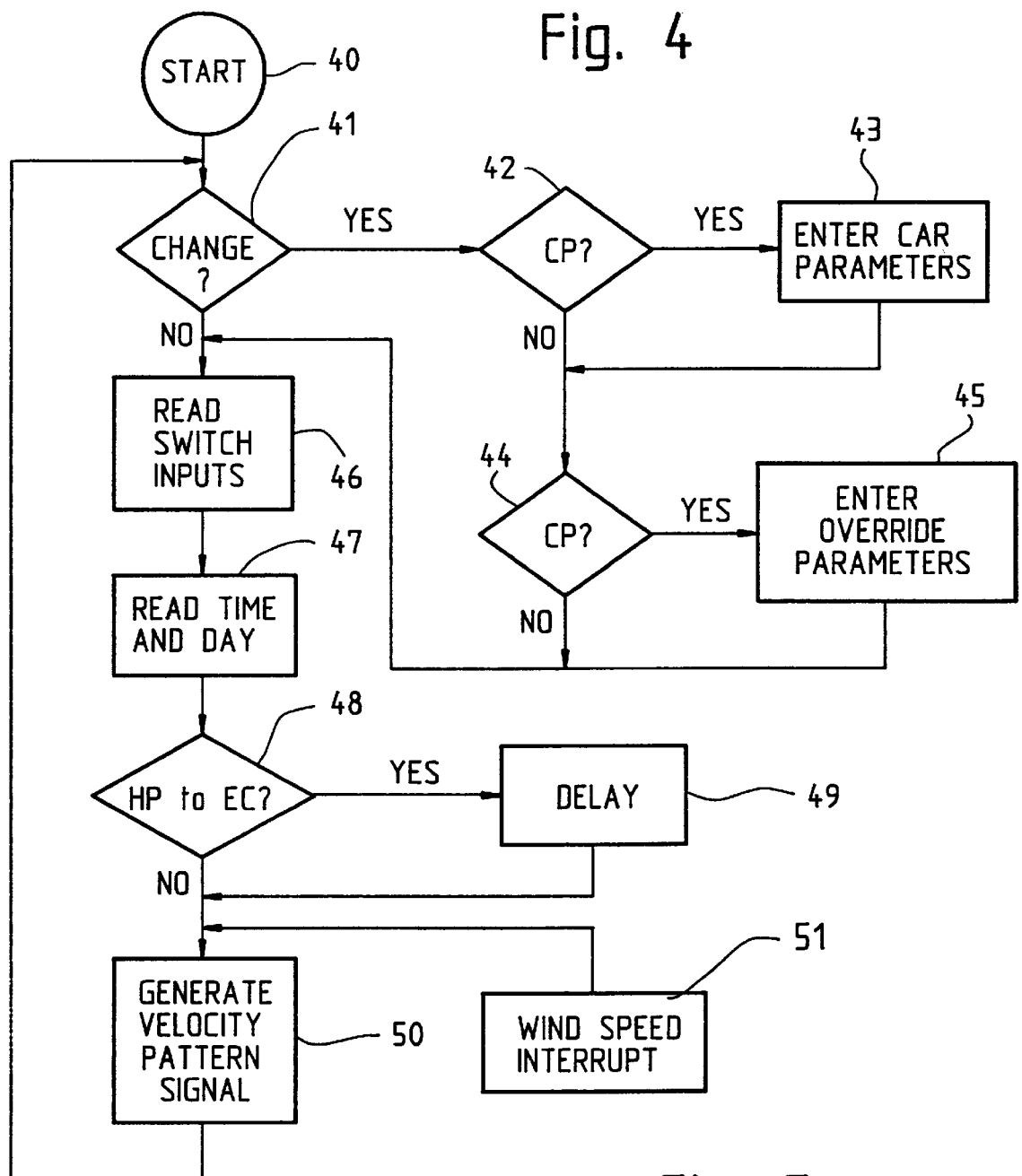
FIG. 4 is a flow diagram of the method of operating an elevator system in accordance with the present invention.

There is shown in the FIG. 4 a flow diagram of the method of operation described above. The method begins at a circle 40 START and enters a decision point 41 CHANGE? to check for the presence of a change signal from the input device 17 (FIG. 1) indicating that a parameter is to be changed. If the change signal is present, the method branches from the point 41 at "YES" to a decision point 42 CP? to check for a change in the car parameters. If a car parameter change is desired, the method branches from the point 42 at "YES" and enters an instruction set 43 ENTER CAR PARAMETERS. Now the user can change any of the parameters shown on the screen in the FIG. 3A. The method enters a decision point 44 CP? either from the instruction set 43, or from a "NO" branch of the decision point 42 when no car parameter is to be changed. In the decision point 44, a check is made for a change in the override parameters. If an override parameter change is desired, the method branches from the point 44 at "YES" and enters an instruction set 45 ENTER OVERRIDE PARAMETERS. Now the user can change any of the parameters shown on the screen 32 in the FIG. 3B.

The method enters an instruction set 46 READ SWITCH INPUTS either from a "NO" branch of the decision point 41 when no change is to be made, or from the instruction set 45, or from a "NO" branch of the decision point 44 when no override parameter is to be changed. The control means 13 checks inputs from the software switch settings "1–4" listed above in an instruction set 47 READ TIME AND DAY wherein the values for the actual time of the day and the day of the week are read from a clock means in the control means 13. The method then enters a decision point 48 HP to EC? to check whether a change from the high performance mode to the energy conservation mode is to be made. The method branches from the point 48 at "YES" if such a change is to be made and enters an instruction set 49 DELAY. The instruction set delays the mode change until the control means 13 has been in the high performance mode for a predetermined time, such as three minutes, to prevent debouncing as described above. The method enters an instruction set 50 GENERATE VELOCITY PATTERN SIGNAL either from the instruction set 49, or from a "NO" branch of the decision point 48 when the desired change is from the EC mode to the HP mode. The instruction set 50 generates the velocity pattern in accordance with the car parameters and the override parameters based upon the day, the time of the day and the traffic conditions and the switch settings. The method of operation returns to the decision point 41 to restart the operation cycle.

It may be desirable to automatically modify the velocity pattern in response to a condition sensed by one of the sensors 16 (FIG. 1) connected to the elevator control 13. For example, the sensors 16 can include a wind speed sensor typically mounted on top of the building (not shown) served by the elevator system 10 for generating a signal representing the actual wind speed. A wind speed above a predetermined value is recognized by the control means 13 which then generates an interrupt 51 WIND SPEED INTERRUPT to the method of operation. The interrupt 51 causes the elevator control 13 to reduce the maximum constant speed thereby generating a velocity pattern similar to the second pattern modification 22 shown in the FIG. 2B. The value of the reduced constant speed can be modified through use of the input device 17. The velocity pattern can be automatically returned to the maximum constant speed when the sensor 16 indicates that the wind speed has dropped below the predetermined value. The actual wind speed can be averaged over a predetermined time period by the sensor 16 or by the control means 13 to prevent intermittent gusts from triggering the reduced constant speed. Although the interrupt 51 is shown as entering the flow diagram of the FIG. 4 just prior to the instruction set 50, it can be made effective at any point in the operation cycle.

Figure 5:
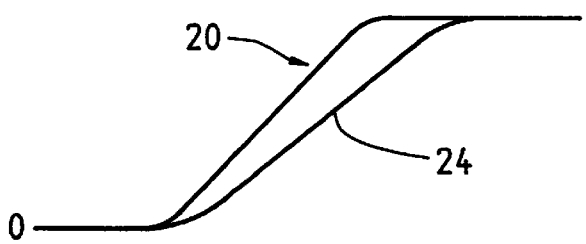
FIG. 5 is a velocity pattern generated in accordance with the method of operating shown in the FIG. 4 by the control apparatus shown in the FIG. 1.

The FIG. 5 shows a velocity pattern generated in accordance with the method of operating described in connection with the FIG. 4. In the test described above, the maximum acceleration factor and the rate of acceleration factor were decreased from the high performance values. As a result of these changed factors, the initial portion of the high performance velocity pattern 20 between startup and constant speed becomes a fourth pattern modification 24 which is the energy conservation mode of operation.

The present invention is particularly usefull when modernizing an existing elevator system. There is shown in the FIG. 6 a conventional prior art elevator system 60 including an elevator car 61 mounted for movement in an elevator shaft (not shown) to serve various floors of a building. A drive means 62 is coupled to the car 61 in a conventional manner, such as a sheave and cable (not shown), for moving the car up and down the shaft. An elevator control means 63 is connected to the drive means 62 to control the speed thereof thereby controlling the starting, stopping and speed of movement of the car 61. The control means 63 is connected to a plurality of hall call devices 64 that are located at the floors to be served by the car 61. A car call device 65 is located in the car 61 and is connected to the control means 63 for actuation by a passenger. Electrical power is supplied to the components of the system by a main power source 66 that typically is the electrical power distribution system for the building in which the elevator system 60 is installed. Although shown as being connected to the drive 62, the main power source 66 can be connected directly or indirectly to each of the system components 61 through 65 to supply electrical power thereto. In the case of a power failure, an emergency power supply 67 is connected to the drive 62 (and the other system components) to supply the power necessary to operate the elevator system 60 to at least allow passengers in the car 61 to exit.

When modernizing an elevator system such as the one shown in the FIG. 6, it is typical to replace the elevator drive 62 and the elevator control 63. The prior art drive 62 may be a motor-generator set that is 13. As replaced by the solid state drive 12 while the prior art control is replaced by the control 13. As shown in the FIG. 7, the prior art elevator system 60 becomes a modernized elevator system 70 according to the present invention by substituting the drive 12 and the control 13. However, the solid state drive 12 typically requires more start up current than the m-g set drive 62. Thus, the emergency power supply 67 may not have enough capacity to power the new drive 12 at start up. Prior to the control apparatus according to the present invention, a modernization project would also require a costly upgraded, larger capacity emergency power supply. The control apparatus according to the present invention solves this problem by automatically responding to the application of emergency power. The emergency power supply 67 is connected to one of the sensors 16 to signal the elevator control 13 that the main power source 66 has failed and emergency power is being supplied. The control 13 responds by selectively operating the system 70 in the energy conservation mode thereby reducing the start up current required by the drive 12 to a level that can be supplied by the existing emergency power supply. Thereby, the cost and time required to modernize an existing elevator system are reduced. Even in a new elevator installation, the emergency power supply can be a smaller and less costly type when the energy conservation mode of operation is utilized.

In summary, the elevator system 10 has the elevator car 11 mounted for movement in the elevator shaft of the building, the drive means 12 coupled to the elevator car for moving the elevator car to serve floors in the building and the plurality of hall call devices 14 located at floors served by the elevator car for generating hall call signals in response to actuation by persons at the floors to be served by the elevator car. The apparatus 10 includes the control means 13 for generating the velocity pattern signal 20, the control means storing parameter values representing desired jerk, acceleration and constant speed relative to time for the velocity pattern signal and generating the velocity pattern signal in response to each hall call signal generated by the hall call devices 14. The drive means 12 responds to the velocity pattern signal to move the elevator car 11 to the floor associated with each hall call signal. The control means 13 generates the high performance velocity pattern signal 20 from a first set of the parameter values in response to a first predetermined number of the hall call signals in a predetermined time period and generates the energy conservation velocity pattern signal 21, 22 and 23 from a second set of the parameter values in response to a second predetermined number of the hall call signals in the predetermined time period. The apparatus 10 also includes the input device 17 connected to the control means 13 for generating input signals representing values of the parameters whereby a user can change at least one of the stored parameter values in each of the first and second sets of the parameter values thereby altering the high performance velocity pattern signal 20 and the energy conservation velocity pattern signal 21, 22 and 23.

The control means 13 responds to a high performance set signal generated by the input device 17 to continuously generate the high performance velocity pattern signal 20 and responds to an energy conservation performance set signal generated by the input means to continuously generate the energy conservation performance velocity pattern signal 21, 22 and 23. Further, the control means 13 responds to time and day set signals generated by the input device 17 to generate the energy conservation performance velocity pattern signal during selected times on selected days of the week. The control means 13 delays switching from generating the high performance velocity pattern signal to generating the energy conservation performance velocity pattern signal until the high performance velocity pattern signal has been generated for a minimum predetermined time period.

The method of controlling an elevator system includes the steps of: a. selectively operating an elevator control system in a high performance mode to move an elevator car to serve hall calls at floors in a building; b. selectively operating the elevator control system in an energy conservation performance mode to move the elevator car to serve the hall calls; c. selectively operating the elevator control system in a time and day performance mode including operating according to the step b. during selected time periods on selected days of the week and operating according to the step a. during all other times; and d. when operation according to all of the steps a., b. and c. is not selected, operating the elevator control system in a dynamic mode including operating according to the step a. in response to a generation of at least a predetermined number of the hall calls over a predetermined time period and operating the elevator control system according to the step b. in response to a generation of less than the predetermined number of hall calls over the predetermined time period. The high performance mode includes moving the elevator car at rated values of jerk, acceleration and constant speed and the energy conservation performance mode includes moving the elevator car at less than rated values of jerk and acceleration.

The step b. includes switching from the high performance mode to the energy conservation mode when emergency power is applied to the elevator control system. The step d. includes delaying switching from the high performance mode to the energy conservation mode until the elevator control system has been operated in the high performance mode for a minimum predetermined time period such as approximately three minutes. The step d. also includes switching from the energy conservation mode to the high performance mode when a hall call has been waiting to be served for a maximum predetermined time period such as approximately two minutes.

One or more sensors 16 can be connected to an input of the control means 13 to generate signals representing conditions that may require a change in the velocity pattern. For example, a wind speed sensor can be utilized to cause the control means 13 to reduce the maximum constant speed to the velocity pattern 22 shown in the FIG. 2B with a lower constant speed portion. An emergency power sensor can be utilized to cause the control means 13 to reduce the startup portion of the velocity pattern to the pattern 24 shown in the FIG. 5.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method of controlling an elevator system having an elevator car for serving hall calls at floors of a building comprising the steps of:
   a. selectively operating an elevator drive means coupled to an elevator car in a high performance mode to move the elevator car to serve hall calls at floors in a building;
   b. selectively operating the elevator drive means in an energy conservation performance mode to move the elevator car to serve the hall calls; and
   c. sensing an actual value of at least one predetermined condition and, in response to said actual value of each said predetermined condition, selectively operating the elevator drive means in said energy conservation performance mode during an associated one portion of a movement of the elevator car from one floor to another floor and in said high performance mode during another portion of the same movement of the elevator, wherein said one predetermined condition is wind speed and said associated one portion is during a constant velocity travel of the elevator car.

2. The method according to claim 1 wherein another said predetermined condition is an application of emergency power to the elevator drive means and said associated one portion is during a start up of the elevator car.

3. The method according to claim 1 including a step d. of repetitively performing an operating cycle by checking for a presence of a requested change in a value of a car parameter, changing the value of the car parameter in response to a requested change and controlling the elevator drive means in accordance with a current value of the car parameter.

4. The method according to claim 3 where said step c. interrupts said step d.

5. A method of controlling an elevator system having an elevator car for serving hall calls at floors of a building comprising the steps of:
   a. selectively operating an elevator drive means coupled to an elevator car in a high performance mode to move the elevator car to serve hall calls at floors in a building;
   b. selectively operating the elevator drive means in an energy conservation performance mode to move the elevator car to serve the hall calls;
   c. selectively operating the elevator control system in a time and day performance mode including operating according to said step b. during selected time periods on selected days of the week and operating according to said step a. during all other times;
   d. sensing application of emergency power to the elevator drive means and selectively operating the elevator drive means in said energy conservation performance mode during a start up of the elevator car; and
   e. when operation according to all of said steps a., b., c. and d. is not selected, operating the elevator control system in a dynamic mode including operating according to said step a. in response to a generation of at least a predetermined number of the hall calls over a predetermined time period and operating the elevator control system according to said step b. in response to a generation of less than the predetermined number of hall calls over the predetermined time period.

6. The method according to claim 5 wherein tie high performance mode includes moving the elevator car at rated values of jerk, acceleration and constant speed and the energy conservation performance mode includes moving the elevator car at less than the rated values of jerk and acceleration.

7. The method according to claim 5 wherein said step e. includes delaying switching from the high performance mode to the energy conservation mode until the elevator control system has been operated in the high performance mode for a minimum predetermined time period.

8. The method according to claim 5 wherein said step e. includes switching from the energy conservation mode to the high performance mode when a hall call has been waiting to be served for a maximum predetermined time period.

9. An apparatus for controlling an elevator system having an elevator car mounted for movement in an elevator shaft of a building, a drive coupled to the elevator car for moving the elevator car to serve floors in the building and a plurality of hall call devices located at floors served by the elevator car for generating hall call signals in response to actuation by persons at the floors to be served by the elevator car, the apparatus comprising:

a control means for generating a velocity pattern signal, said control means storing parameter values representing desired jerk, acceleration and constant speed relative to time for said velocity pattern signal, whereby when said control means is connected to an elevator drive means coupled to an elevator car and to a plurality of hall call devices, said control means generates said velocity pattern signal in response to each hall call signal generated by the hall call devices and the drive means responds to said velocity pattern signal to move the elevator car to the floor associated with each hall call signal, said control means generating a high performance velocity pattern signal from a first set of said parameter values in response to a first predetermined number of the hall call signals in a predetermined time period and generating an energy conservation velocity pattern signal from a second set of said parameter values in response to a second predetermined number of the hall call signals in said predetermined time period;

an input device connected to said control means for generating input signals representing values of said parameters whereby a user can generate said input signals to change at least one of said stored parameter values in each of said first and second sets of said parameter values thereby altering said high performance velocity pattern signal and said energy conservation velocity pattern signal; and sensor means connected to said control means for sensing a predetermined condition, said control means responding to said predetermined condition for generating a modified velocity pattern signal to the drive means.

10. The apparatus according to claim 9 wherein said predetermined condition is an application of emergency power to the drive means and said modified velocity pattern signal includes a start up portion of said energy conservation velocity pattern signal and a remaining portion of said high performance velocity pattern signal.

11. The apparatus according to claim 9 wherein said predetermined condition is a high wind speed condition and said modified velocity pattern signal includes a constant velocity portion having a value less than a maximum constant velocity portion of said high performance velocity pattern signal.

12. The apparatus according to claim 9 wherein said control means delays switching from generating said high performance velocity pattern signal to generating said energy conservation performance velocity pattern signal until said high performance velocity pattern signal has been generated for a minimum predetermined time period.

\* \* \* \* \*